United States Patent [19]

Comyns-Carr et al.

[11] 4,282,712

[45] Aug. 11, 1981

[54] DEVICES FOR EXTRACTING ENERGY FROM WAVES

[75] Inventors: Cecil A. Comyns-Carr, Bath; Michael J. Platts, Willingham, both of England

[73] Assignee: The Secretary of State for Energy in Her Britannic Majesty's Government of the United Kingdom of Great Britain and Northern Ireland, London, England

[21] Appl. No.: 92,200

[22] Filed: Nov. 7, 1979

[30] Foreign Application Priority Data

Nov. 17, 1978 [GB] United Kingdom ............ 450748/78

[51] Int. Cl.³ .......................... F03B 13/12; E02B 9/08
[52] U.S. Cl. ...................................... 60/500; 60/501; 417/332
[58] Field of Search ............... 60/497, 500, 501, 502, 60/505, 506; 417/332; 290/53

[56] References Cited

U.S. PATENT DOCUMENTS

| 4,077,213 | 3/1978 | Hagen | 60/500 |
| 4,098,084 | 7/1978 | Cockerell | 60/500 |
| 4,118,932 | 10/1978 | Sirill | 60/500 |
| 4,210,821 | 7/1980 | Cockerell | |

*Primary Examiner*—Allen M. Ostrager
*Attorney, Agent, or Firm*—William R. Hinds

[57] ABSTRACT

The invention relates to a device for extracting energy from waves, the device having a pump or a number of pumps arranged to be operated by relative motion between hingedly connected members of the device in response to waves so as to displace a fluid. The device according to the invention is provided with a vane pump having a pump chamber defined by one of the members and a vane extending from an adjacent member so as to be displaced in the pump chamber by the relative motion of the members to displace the fluid. The members may be hingedly connected together at a number of locations at which a respective bearing is supported by a resiliently flexible mounting.

11 Claims, 18 Drawing Figures

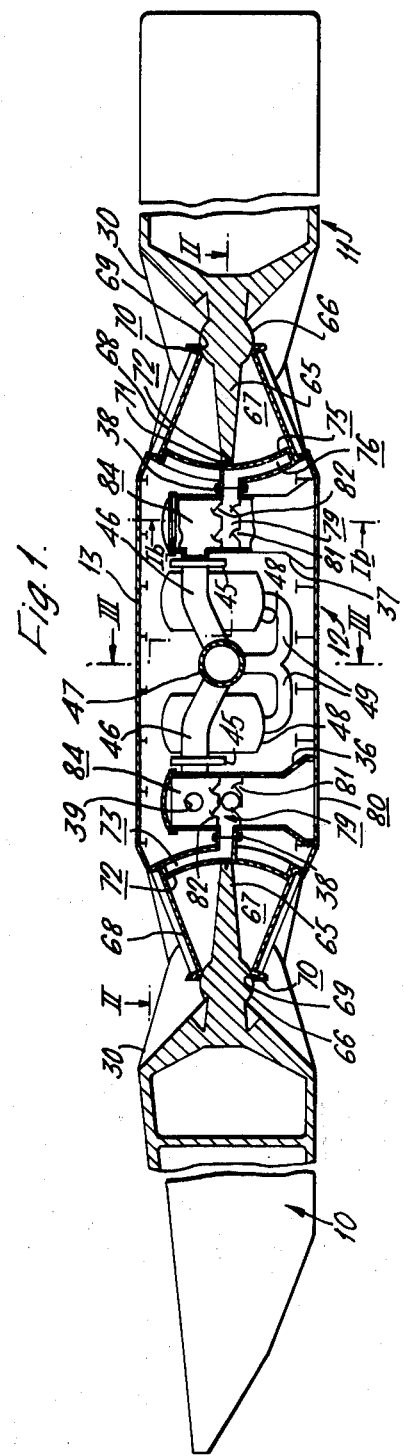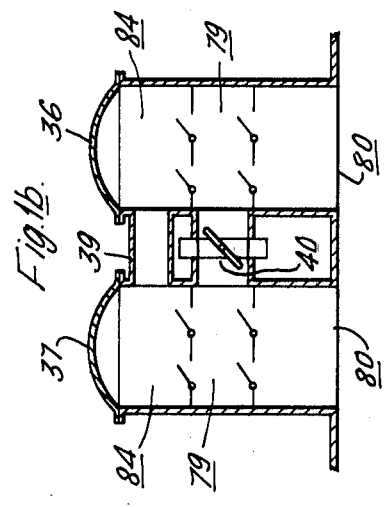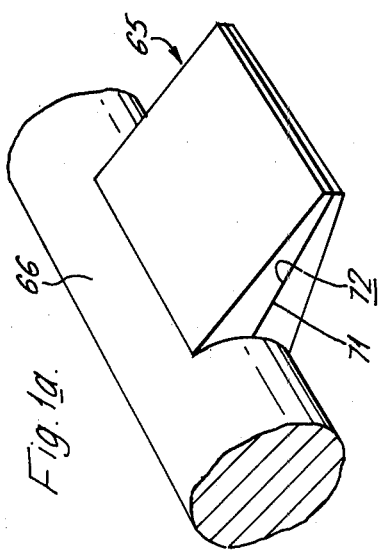

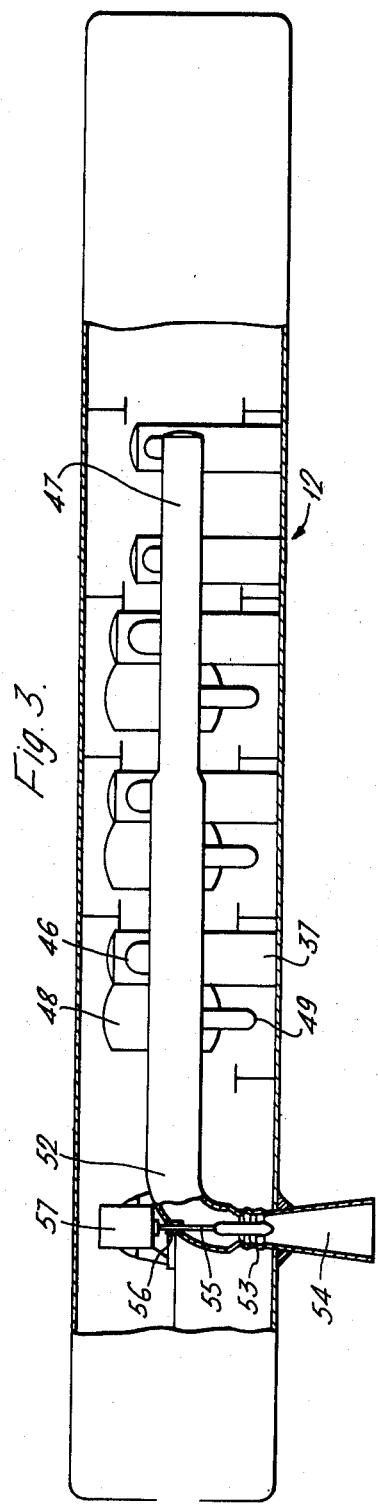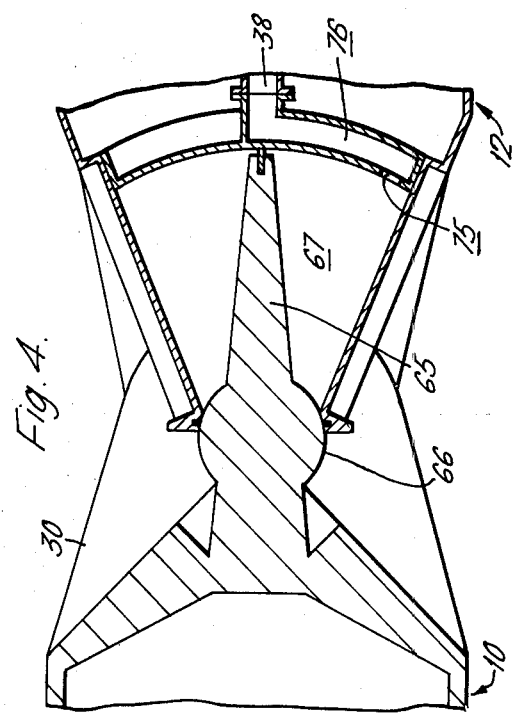

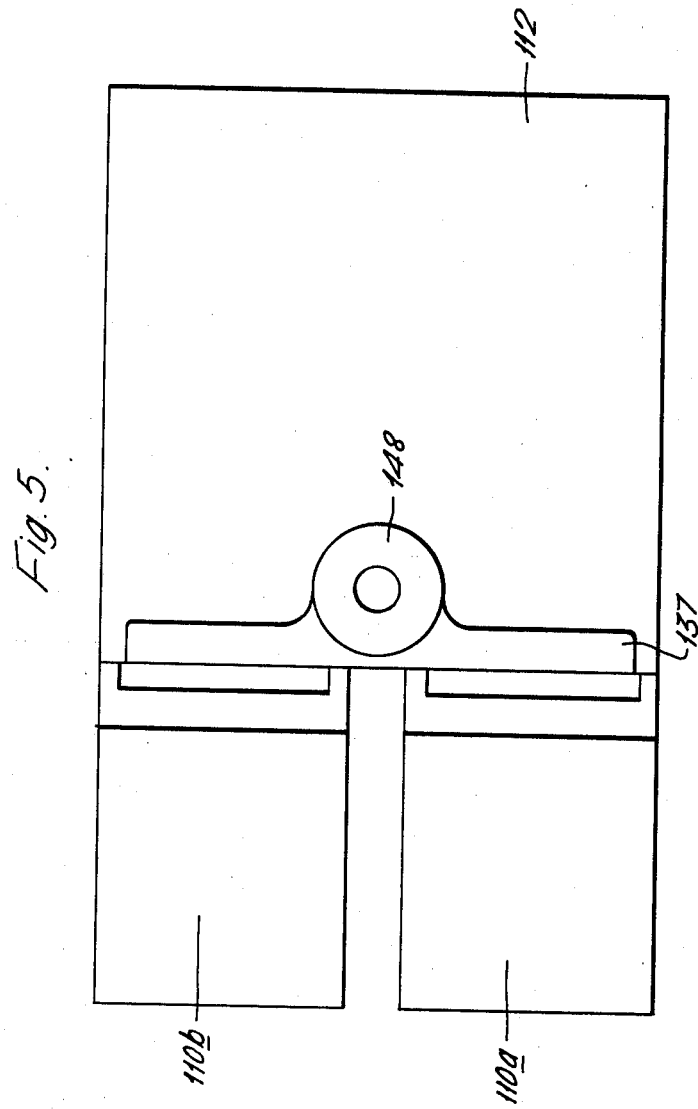

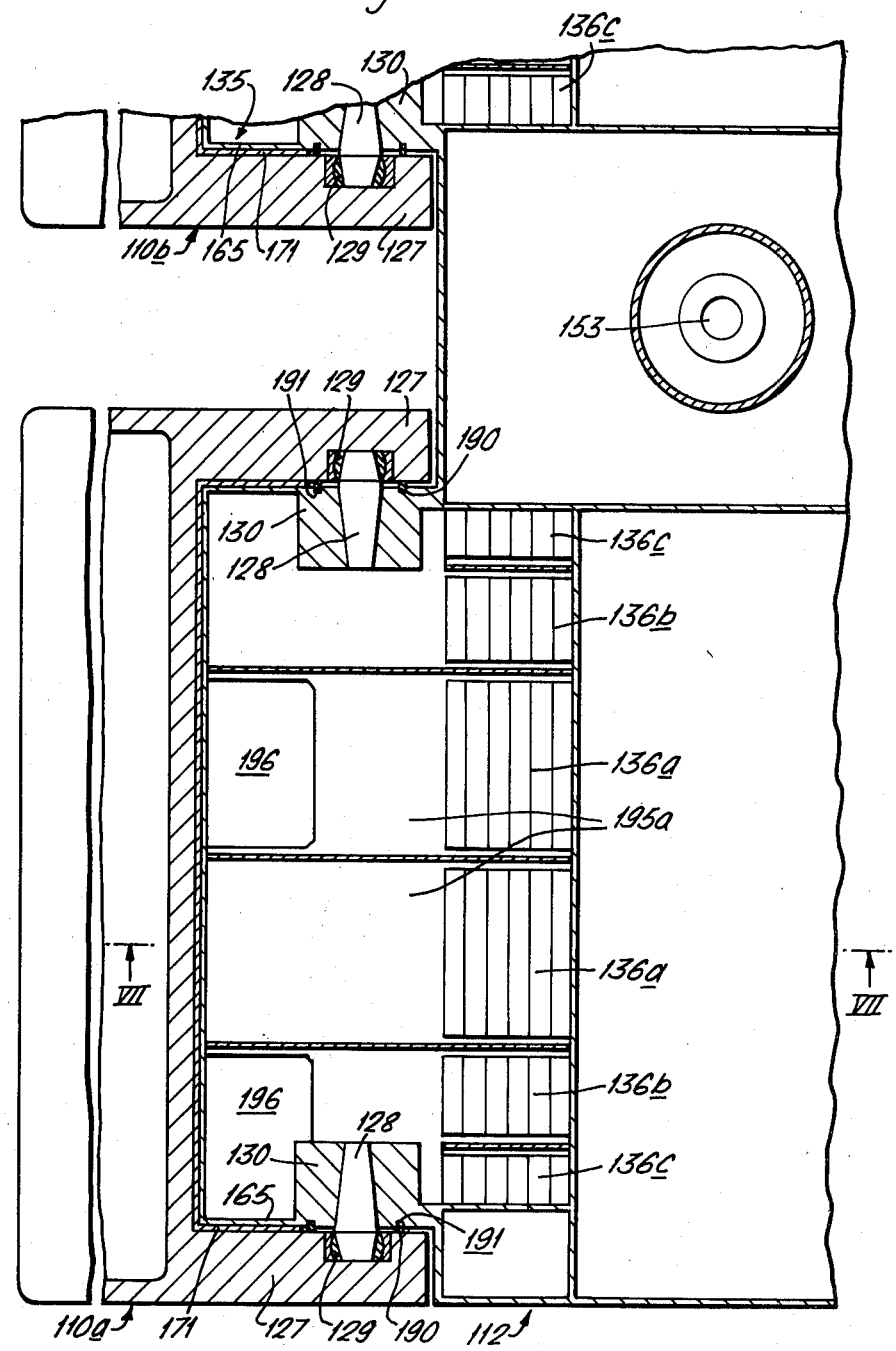

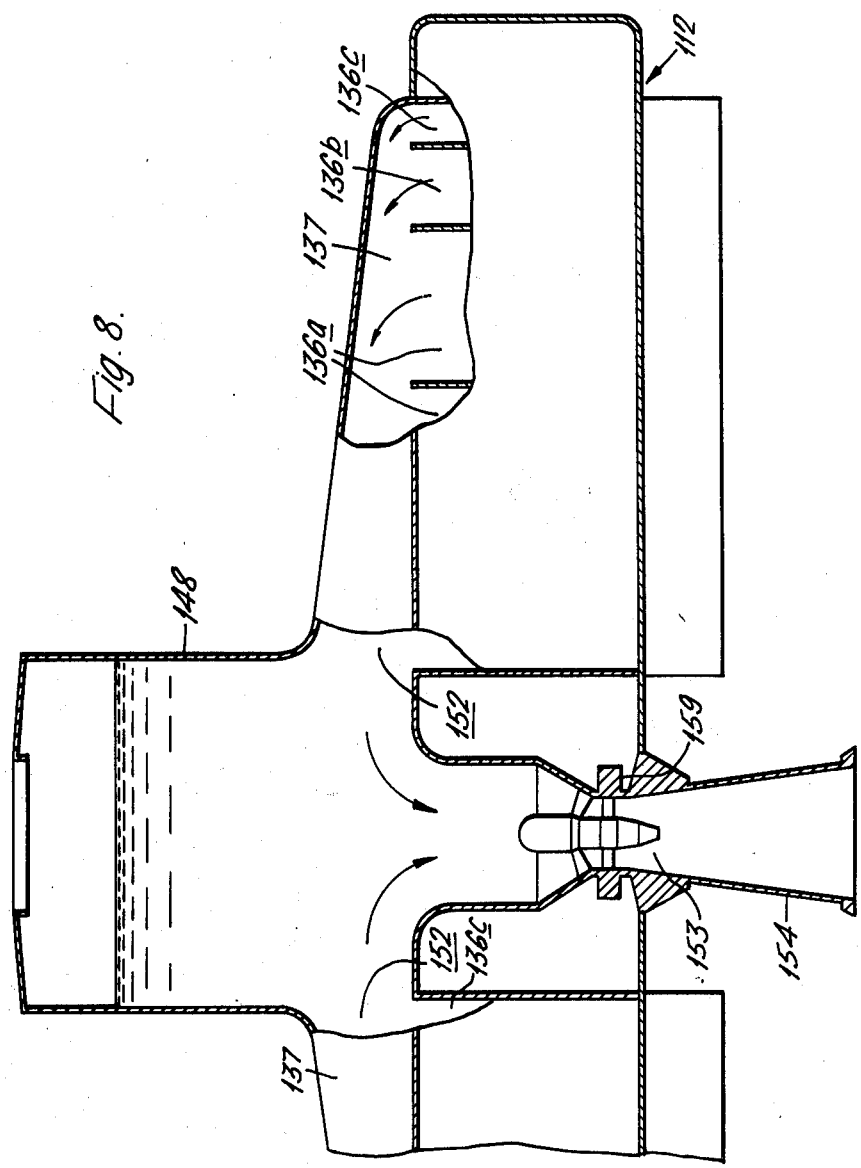

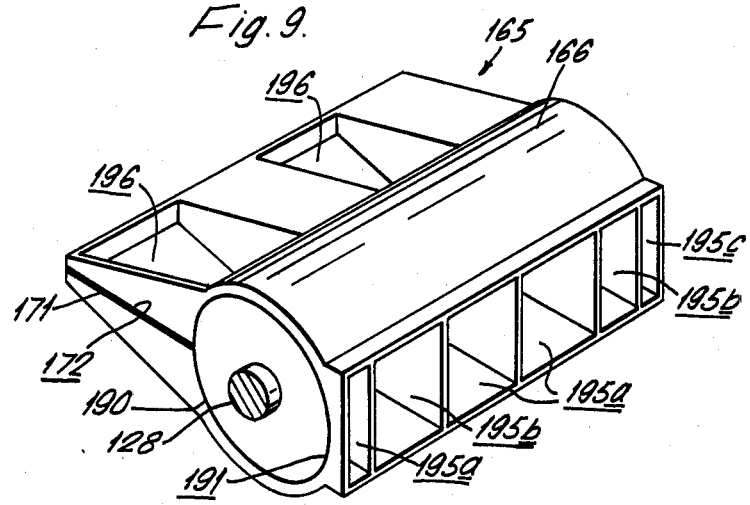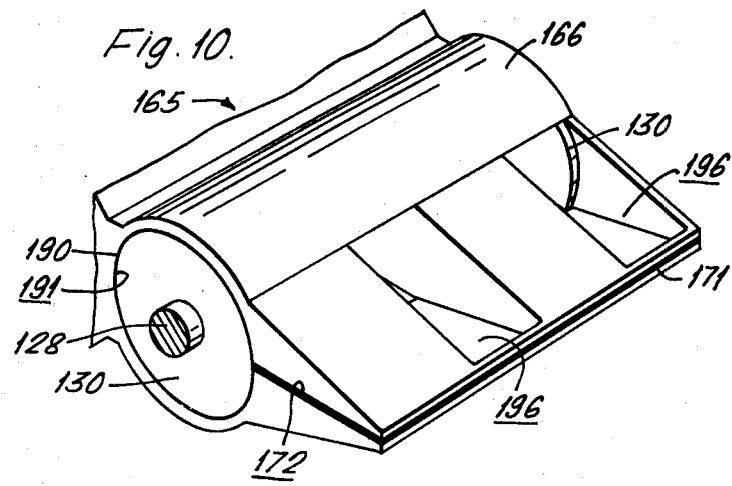

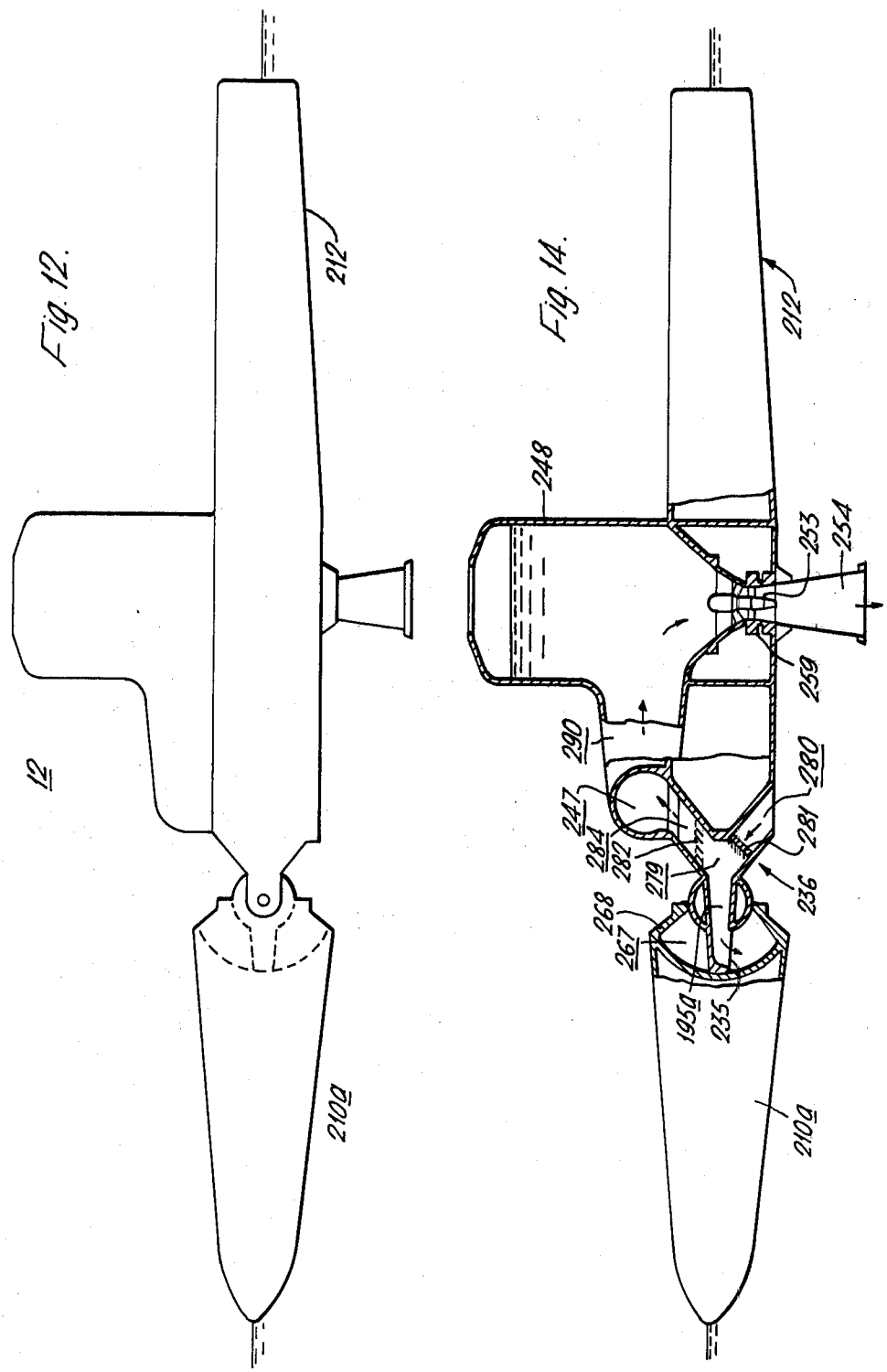

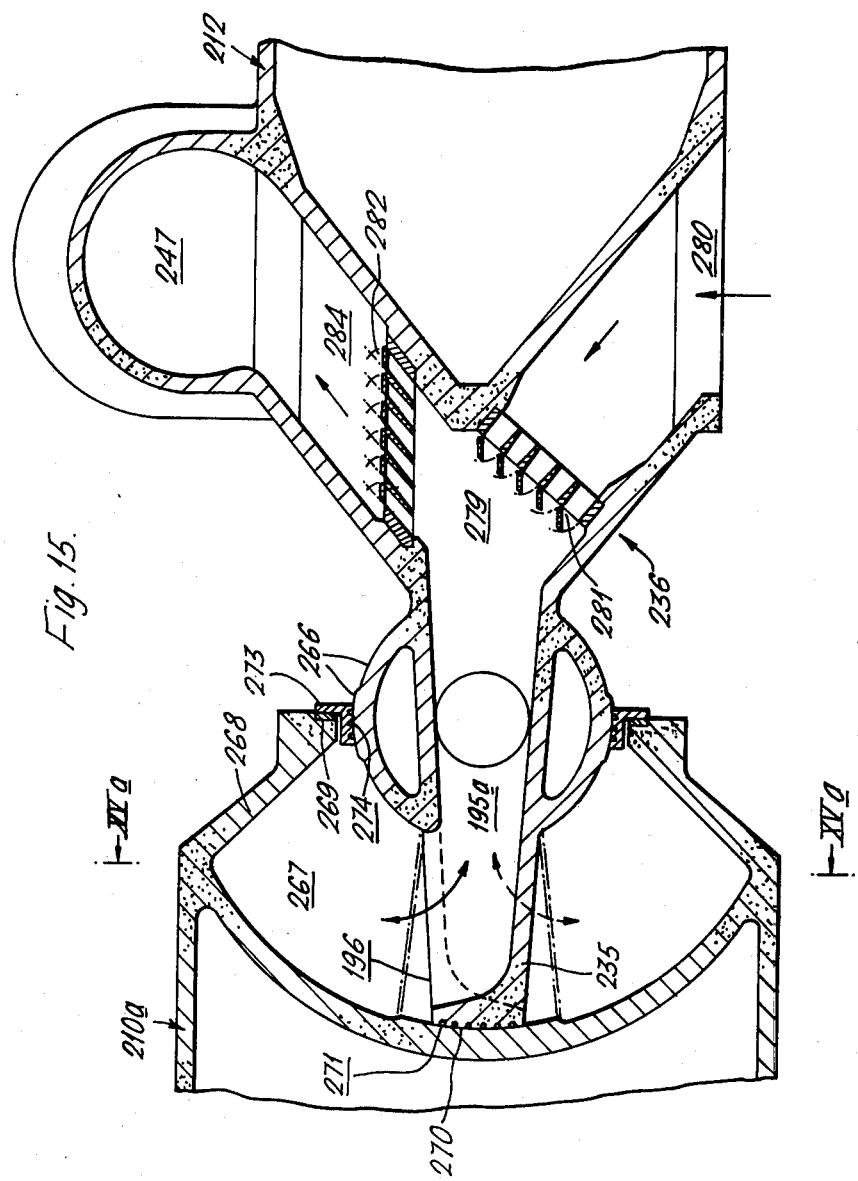

DEVICES FOR EXTRACTING ENERGY FROM WAVES

This invention relates to devices for extracting energy from waves and more particularly, but not exclusively, to devices in which relative motion between buoyant members in response to waves is used to derive an energy output from the device.

An article which examined the potential of wave power in the seas around the United Kingdom appeared in "Chartered Mechanical Engineer", September 1978, pp. 41-47, published by the Institution of Mechanical Engineers, London, England. One of the devices for extracting energy from waves mentioned in this article and based on a concept proposed by Sir Christopher Cockerell comprises buoyant members hinged together such that relative motion between the members operates a pump to displace a fluid and performs useful work, said device being hereinafter referred to as the "Cockerell Raft". The Cockerell Raft is also the subject of British Pat. No. 1,448,204 to which reference should be made, and an article on the development of wave energy systems using the principle of the Cockerell Raft appeared in New Scientist pp. 241-243, May 1, 1975.

According to the present invention, there is provided a device for extracting energy from waves on a liquid having at least two members hingedly connected one to another so as to allow angular relative motion between the members in response to waves, at least one of the members being of buoyant construction, and pump means between said hingedly connected members for displacing fluid in response to said relative motion, wherein said pump means comprises a vane pump having a pump chamber provided by one of the hingedly connected members and a vane extending from the other hingedly connected member into said chamber so as to be displaced in said chamber by said relative motion, thereby to displace said fluid.

Preferably, the vane is arranged to pivot about an axis substantially co-axial with that of the hinged connection of the two members.

A channel may be provided in the vane for the flow therethrough of the liquid into and out of the pump chamber.

The hinged connection of the two members may comprise a plurality of hinge bearings, each hinge bearing being supported by resiliently flexible means comprising elastomeric material.

Several of the members may be hingedly connected in parallel relationship to a common said member, at least one said vane pump being between each said parallel member and the said common member.

A plurality of the members may be hingedly connected together in series relationship, each adjacent pair of the members having at least one said vane pump therebetween.

A plurality of the vane pumps in parallel relationship may be between the hingedly connected members.

The device may include a reservoir for receiving liquid displaced by the vane pumps, and a turbine means below the reservoir and through which the reservoir is arranged to discharge, the reservoir having an overflow arranged so as to limit the pressure head of the liquid on the turbine.

The fluid may comprise a liquid in which the device is adapted to float, or may comprise a fluid of a closed circuit system and arranged to be displaced by the or each vane pump.

The invention will now be described by way of example only with reference to the accompanying drawings, in which:

FIG. 1 shows in sectional elevation a diagrammatic representation of part of a Cockerell Raft;

FIG. 1a shows a fragmentary perspective view of part of the Raft of FIG. 1;

FIG. 1b shows a view on the line Ib—Ib of FIG. 1;

FIG. 3 shows a sectional representation on the line III—III of FIG. 1;

FIG. 4 shows a fragmentary sectional representation on the line IV—IV of FIG. 2;

FIG. 5 shows in plan a diagrammatic representation of an alternative Cockerell Raft;

FIG. 6 shows to an enlarged scale a sectional representation of part of the Raft of FIG. 5;

FIG. 8 shows a sectional representation on the line VIII—VIII of FIG. 7;

FIG. 9 shows a perspective view of part of the Raft of FIG. 7;

FIG. 10 shows the part of FIG. 9 but inverted;

FIG. 12 shows in side elevation the Raft of FIG. 11;

FIG. 14 shows a sectional representation on the line XIV—XIV of FIG. 11;

FIG. 15 shows a fragmentary sectional representation on the line XV—XV of FIG. 13.

Figure 2:
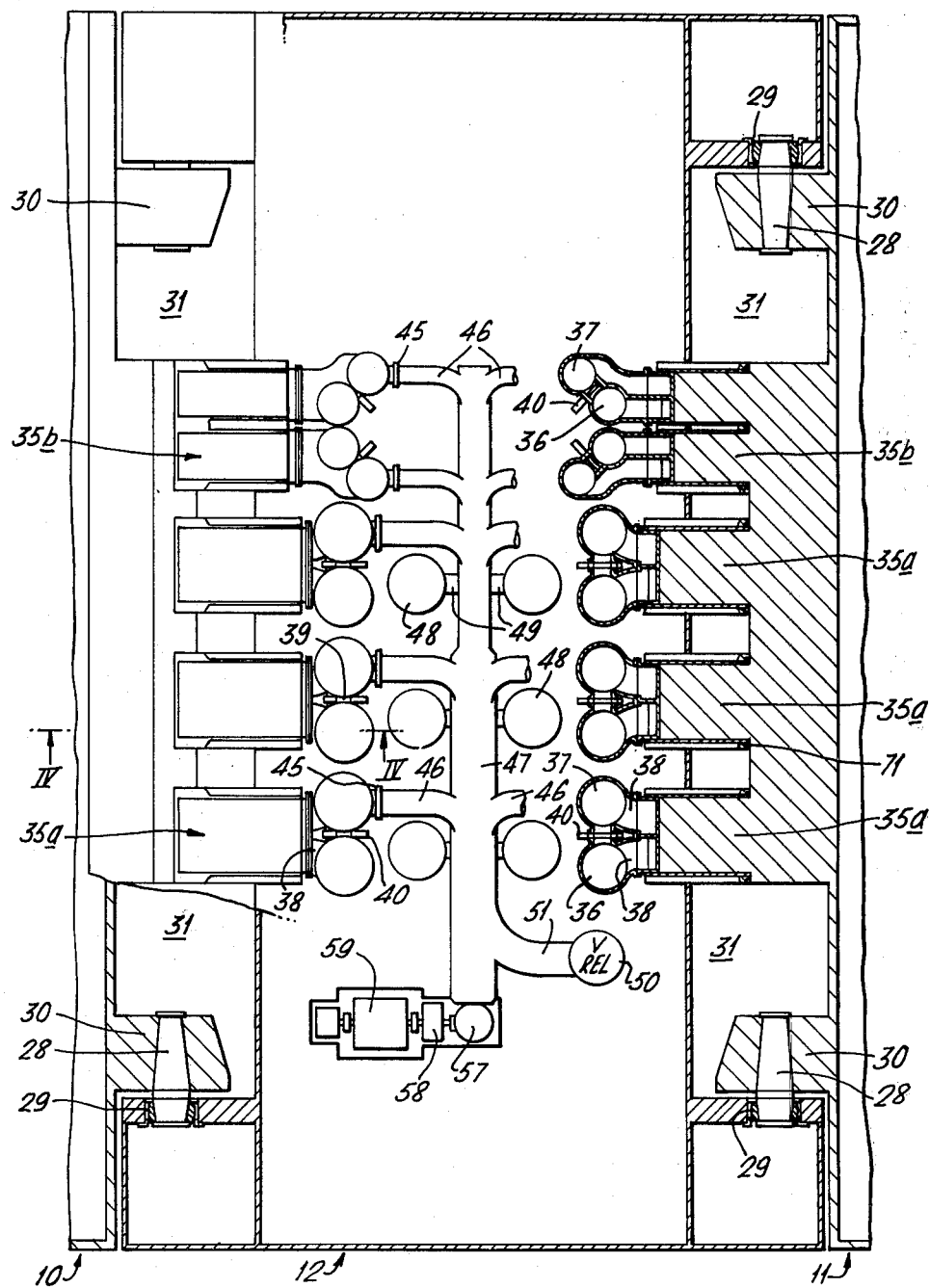
FIG. 2 shows a sectional representation on the line II—II of FIG. 1.

Referring to FIG. 1, the Cockerell Raft shown comprises a leading pontoon 10, an aft pontoon 11 which is longer than the leading pontoon 10, and an intermediate pontoon 12. The leading pontoon 10 and the aft pontoon 11 are generally fabricated from ferro-concrete, whilst the intermediate pontoon 12 is essentially of steel construction having a steel skin 13 and conventional steel reinforcements 14.

Referring now to FIG. 2, the aft pontoon 11 is hinged to the intermediate pontoon 12 by two steel, tapered stub shafts 28 (only one is shown) each of which locates at one end in a respective spherical bearing 29 in the intermediate pontoon 12 and at its other end is held in a projecting portion 30 of the aft pontoon 11 which extends into a space 31 in the intermediate pontoon 12. The leading pontoon 10 is hinged to the intermediate pontoon 12 in an identical manner to that described in relation to the aft pontoon 11.

Five double-acting pumps in the form of three relatively large capacity pumps 35a and three smaller capacity pumps 35b are distributed along the junction between the leading pontoon 10 and the intermediate pontoon 12, and an identical number of pumps 35a and 35b are distributed along the junction between the aft pontoon 11 and the intermediate pontoon 12. Each pump 35a and 35b has two rectifying chambers 36 and 37 respectively connected to it by a duct 38, each two rectifying chambers 36 and 37 being connectable together by an unloading valve 40 which is normally closed but when open ensures that there is no pressure difference across the pump 35a or 35b.

Each rectifying chamber 37 is connected by a branch duct 46 having a shut-off valve 45 to a common discharge manifold 47 which is closed at one end and has a stepped bore so as to arrange a substantially uniform flow of liquid inside the discharge manifold 47. An accumulator 48 of the kind adapted to exert a pressure from a trapped quantity of air is connected to the discharge manifold 47 by a duct 49 at a position in advance of each respective branch duct 46, and a pressure relief valve 50 in a relief duct 51 is connected to the discharge manifold 47 near the open end of the discharge manifold 47.

Referring now to FIG. 3, the discharge manifold 47 terminates in a downwardly directed bend 52 and connects to a tubular variable pitch propellor turbine 53, generally known as a tubular Kaplan turbine, as described for example in "Hydro-Electric Engineering Practice", Vol. 2, pp. 191, 2nd Edition, published by Blackie & Son Ltd., Glasgow, Scotland. The turbine 53 has a frusto-conical outlet duct 54 extending below the bottom of the intermediate pontoon 12, and drives a shaft 55 connected by a coupling 56 to a bevel gear assembly 57 which connects, as shown in FIG. 2, through a flywheel 58 to an electric generator 59.

Referring again to FIG. 1, the edge of the leading pontoon 10 adjacent to the intermediate pontoon 12 terminates at each pump 35a and 35b in a tapered vane 65 (only one is shown) having a bearing portion 66 of part-cylindrical form whose longitudinal axis is co-axial with that of the stub shafts 28. The vane 65 extends into a pump body 68 having a pump chamber 67 of sectoral shape in elevation in the intermediate pontoon 12, whilst a rubber seal 69 located in a groove 70 in the pump body 68 at the entrance to the pump chamber 67 bears in sealing engagement both longitudinally and part-circumferentially against the bearing portion 66. Referring now to FIG. 1a which shows a fragmentary perspective view of the vane 65, a rubber seal 71 extends in a central groove 72 along the edge of that portion of the vane 65 which projects into the pump chamber 67, to bear in sealing engagement against the pump body 68.

Referring again to FIG. 1, the pump chamber 67 discharges at its upper end through a port 72 into a passage 73 which is connected by the respective duct 38 to the rectifying chamber 36. Referring now to FIG. 4, the pump chamber 67 at its lower end discharges through a port 75 into a passage 76 connected by the respective duct 38 to the rectifying chamber 37.

Referring to FIGS. 1, 1b and 4, each rectifying chamber 36 and 37 respectively has an inlet 80 for liquid (e.g. seawater) in which the Cockerell Raft is arranged to float, and is subdivided by an inner chamber 79 to which the respective duct 38 connects, and has non-return valves 81 for the flow of liquid from the inlet 80 to the duct 38 and non-return valves 82 for the flow of liquid from the duct 38 to a discharge chamber 84 above the inner chamber 79. The discharge chambers 84 of a respective pair of rectifying chambers 36 and 37 are connected by a duct 39 whilst the inner chambers 79 are connectable through the unloading valve 40.

The pumps 35a and 35b between the aft pontoon 11 and the intermediate pontoon 12 are arranged in an identical manner to that described in relation to the pumps 35a and 35b located between the leading pontoon 10 and the intermediate pontoon 12.

In operation, relative motion between the leading pontoon 10 and the intermediate pontoon 12, and the aft pontoon 11 and the intermediate pontoon 12 in response to waves, causes each of the respective vanes 65 to be displaced in a pivotal manner and sweep out a respective pump chamber 67. As the volume of the pump chamber 67 on one side of each vane 65 increases, liquid is sucked through the inlet 80 and the inner chamber 79 of a respective rectifying chamber 36 or 37 into the passage 76 or 78, and port 75 or 77, and into the pump chamber 67. Liquid on that side of each vane 65 at which the volume of the pump chamber 67 is decreasing, is discharged through the respective port 77 or 75, passage 78 or 76 and the inner chamber 79 to the discharge chamber 84. Liquid from the discharge chambers 84 of the rectifying chamber 36 flows to the respective discharge chambers 84 of the rectifying chambers 37 through the ducts 39 from which the liquid flows through the respective branch duct 46 into the discharge manifold 47 where it is led to the turbine 53 through which it flows to the outlet duct 54, causing rotation of the turbine 53, and finally discharges below the intermediate pontoon 12. Rotation of the turbine 53 produces a corresponding rotation of the gears (not shown) of the bevel gear assembly 57 and of the electric generator 59 which thereby provides an electric output. The flywheel 58 assists in smoothing the drive from the turbine 53 in the event of any uneven relative motion of the leading pontoon 10, intermediate pontoon 12, and aft pontoon 11, whilst the accumulator 48 assist in maintaining a substantially uniform pressure head on the liquid in the discharge manifold 47. The relief valve 50 allows venting of liquid in the discharge manifold 47. The relief valve 50 allows venting of liquid to take place in the vent of an excessive pressure build up in the discharge manifold 47, whilst opening of selected unloading valves 40 allows the torque about the stub shafts 28 to be adjusted independently to obtain optimum performance for a given sea state.

Although the invention has been described in relation to a Cockerell Raft having three pontoons hinged together in series, the invention also has applications in wave power devices having two members hinged in parallel relationship to a common member as shown in FIG. 5 to which reference is now made.

The Cockerell Raft shown in FIG. 5 comprises two identical leading pontoons 110a and 110b hinged in parallel relationship to a rear pontoon 112. The leading pontoons 110a and 110b are fabricated from ferro-concrete and the rear pontoon 112 of steel construction in a manner similar to that described in relation to the leading pontoon 10, aft pontoon 11, and the intermediate pontoon 12 of FIG. 1.

In greater detail with reference to FIG. 6, the leading pontoon 110a is hinged to the rear pontoon 112 by two steel tapered stub shafts 128 each of which locates in a respective spherical bearing 129 in a lug 127 projecting from the leading pontoon 110a, and is held in a boss 130 in a vane pump 135 at the junction between the leading pontoon 110a and the rear pontoon 112. The vane pump 135 is connected to three pairs of rectifying chambers 136a . . . 136c of progressively lower capacity with respect to one another and disposed about one another in parallel relationship.

The leading pontoon 110b is hinged to the rear pontoon 112, and a vane pump 135 and three pairs of rectifying chambers 136a . . . 136c provided therebetween (only a rectifying chamber 136c is shown), in an identical manner to that described in relation to the leading pontoon 110a and the rear pontoon 112.

As shown in FIG. 8 to which reference is now made, the rectifying chambers 136a ... 136c are arranged to discharge liquid into a respective manifold 137 of increasing cross-section, each manifold 137 having an outlet 152 to a "Straflo" straight flow turbine 153 integral with and arranged to drive an electric generator 159, the "Straflo" turbine 153 and generator 159 being supplied by "Straflo" Ltd., 1 King William Street, London EC4N 7AU, England, and Hardstrasse 319, CH-8005 Zurich, Switzerland, to whom reference should be made for further information. A frusto-conical outlet duct 154 extends from the turbine 153 below the rear pontoon 112. The outlets 152 also connect with an open-top reservoir 148 to maintain a substantially constant flow of liquid through the turbine 153 and also to provide an upper limit to the pressure head of the liquid.

Figure 7:
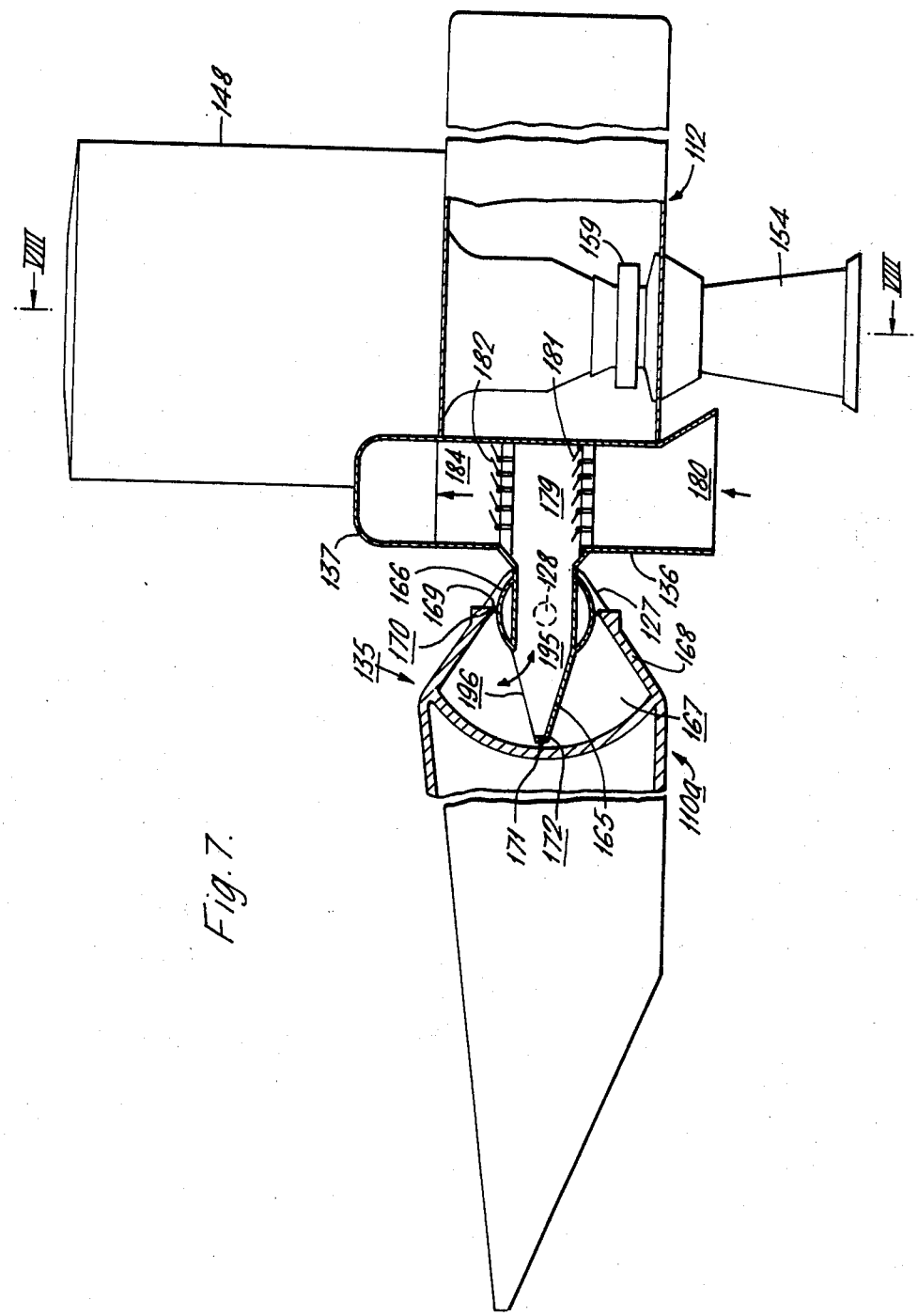
FIG. 7 shows a sectional representation on the line VII—VII of FIG. 6.

Referring to FIG. 7, the vane pump 135 comprises a pump body 168 incorporated in the leading pontoon 110a and defining a pump chamber 167 of sectoral shape in elevation, and a tapered vane 165 extending from the rear pontoon 112 into the pump chamber 167. The vane 165 has a bearing portion 166 of part-cylindrical shape which provides the bosses 130 (not shown in FIG. 7). A rubber seal 169 located in a groove 170 in the pump body 168 at the entrance to the pump chamber 167 bears longitudinally in sealing engagement against the bearing portion 166. A rubber seal 171 extends in a central groove 172 along that portion of the vane 165 which extends into the pump chamber 167 to bear against the pump body 168, and is joined at each end, as shown in FIG. 6, to an 'O' ring seal 190 which is located in an annular groove 191 in the respective boss 130 at each end of the bearing portion 166 to seal the gap between each boss 130 and the respective lug 127.

Referring now to FIG. 9 and FIG. 10 which show fragmentary perspective views of the vane 165, each vane 165 is of hollow construction to provide three pairs of channels 195a ... 195c which are transverse to the bearing portion 166 and have a width to correspond with the rectifying chambers 136a ... 136c (not shown in FIGS. 9 and 10). Each channel 195a terminates at a respective opening 196 but in an alternate manner, and adjacent channels 195b and 195c terminate at a common opening 196 arranged in an alternate manner with respect to the other openings 196.

Referring again to FIG. 6, and FIG. 7, each channel 195a ... 195c leads at its other end to an inner chamber 179 of a respective rectifying chamber 136a ... 136c, each inner chamber 179 having non-return valves 181 for the flow of liquid in which the Cockerell Raft is arranged to float (e.g. seawater) into the inner chamber 179 from an inlet 180 at the bottom of the rear pontoon 112, and non-return valves 182 for the flow of liquid from the inner chamber 179 to a discharge chamber 184 which leads to the respective manifold 137.

In operation, relative motion between the leading pontoon 110a or 110b and the rear pontoon 112 causes the vane 165 of the respective vane pump 135 to be displaced in a pivotal manner in the pump chamber 167 in which it extends. As the volume of the pump chamber 167 on one side of the vane 165 increases, liquid is sucked through the inlet 180 and those inner chambers 179 connected to channels 195a ... 195c having openings 196 to the increasing volume side of the pump chamber 167 so that the liquid flows through these channels 195a ... 195c and openings 196 into the respective pump chamber 167. At the same time on the other side of the vane 165 where the volume of the pump chamber 167 is decreasing, liquid flows from the pump chamber 167 through those openings 196 at this other side of the vane 165 into the respective channels 195a ... 195c and the inner chambers 179 to which they are connected, from which the liquid flows into the respective discharge chamber 184 and into the manifold 137. The liquid leaves the manifold 137 through the outlet 152 and enters the turbine 153 causing rotation of the turbine 153, and thereby an output from the generator 159, and finally discharges through the outlet duct 154. Liquid from the outlet 152 can also flow into the reservoir 148 to provide a reserve of liquid to ensure a substantially constant flow of liquid through the turbine 153, whilst the open top of the reservoir 148 provides an overflow to limit the pressure head of the liquid.

Figure 11:
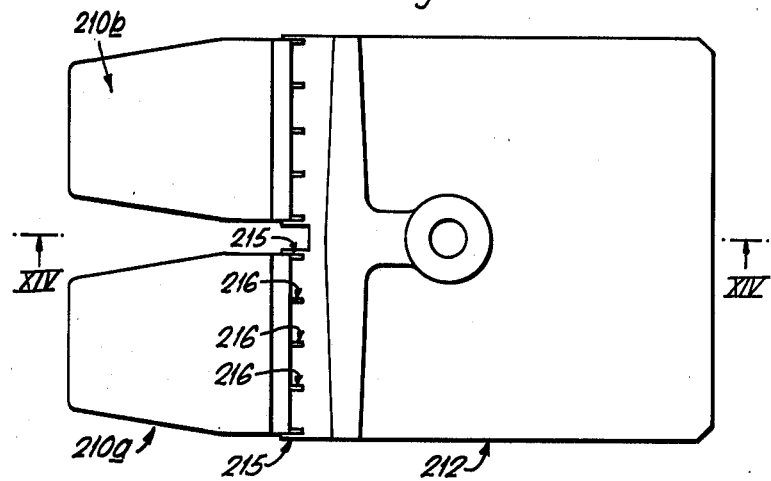
FIG. 11 shows in plan a representation of another Cockerell Raft similar to the Raft of FIG. 6.

Although the invention has been described in relation to members hingedly connected together by two hinge bearings, a plurality of hinge bearings may be used, for example distributed between a plurality of vanes as shown in FIG. 11 and FIG. 12 to which reference is now made.

The Cockerell Raft shown in FIGS. 11 and 12 comprises two identical ferro-concrete leading pontoons 210a and 210b respectively hingedly connected in parallel relationship to a ferro-concrete rear pontoon 212 at two end locations 215 and three inner locations 216 respectively.

Figure 13:
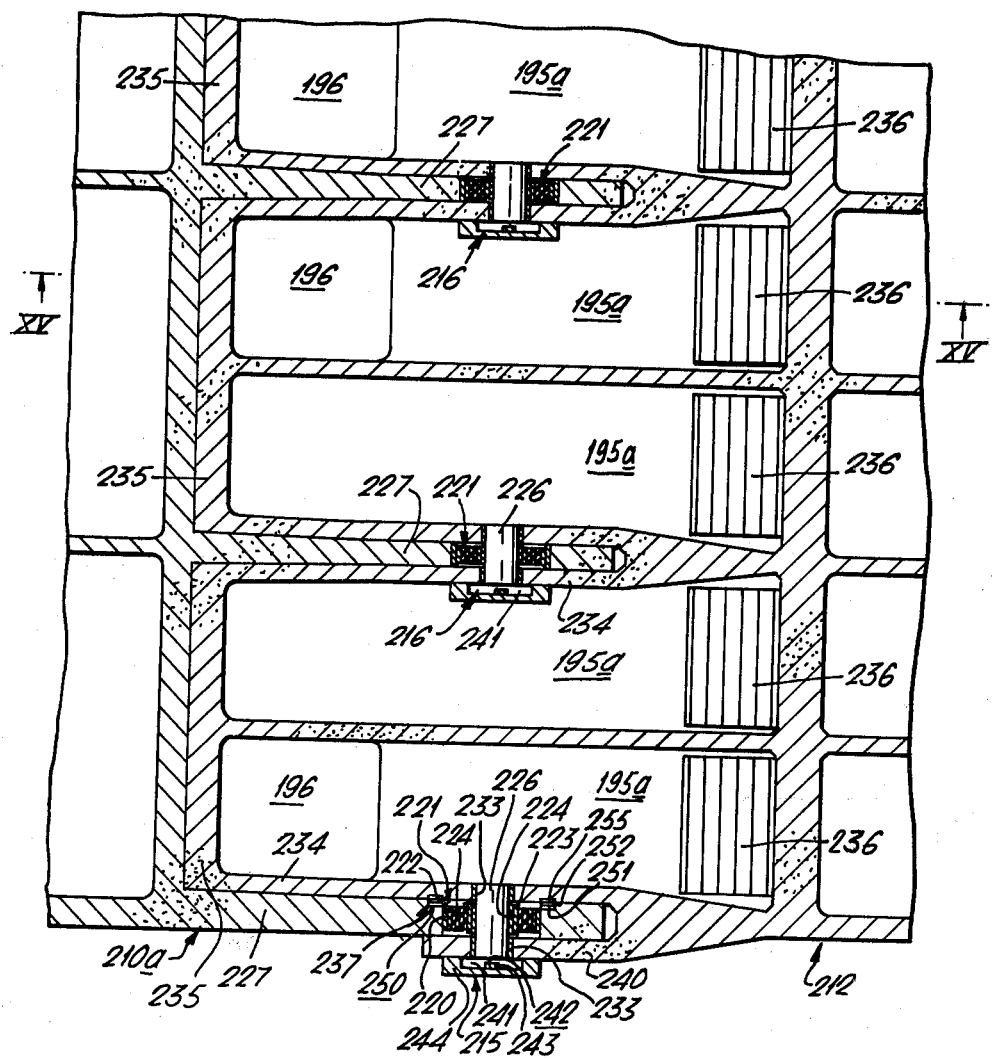
FIG. 13 shows to an enlarged scale, a sectional representation of part of the Raft of FIG. 11.

In greater detail and referring to FIG. 13, the part of the leading pontoon 210a shown comprises several vanes 235 extending in parallel relationship between each end location 215 (only one is shown) and the adjacent inner location 216, and between each pair of adjacent inner location 216 (only two are shown). The vanes 235 are similar in construction to the vanes 135 of FIG. 6 and FIG. 7 in that they are of hollow form but being narrower have only two channels 195a therein terminating at alternately disposed openings 196 (only one is shown in each vane 235). Each channel 195a leads to a rectifying chamber 236 in a similar manner to that described in relation to FIGS. 6 to 8.

At each end location 215 (only one is shown in FIG. 13) a lug 227 extends from the leading pontoon 210a and has a cast in situ bronze liner 220 in which a resiliently flexible journal bearing mounting 221 is fitted. The journal bearing mounting 221 is of conventional design having a metal outer sleeve 222, a metal inner sleeve 223, and a composite rubber/steel laminate 224 between the outer sleeve 222 and the inner sleeve 223. A bush 225 of a bearing material, for example bronze or a metal/polytetrafluoroethylene (PTFE) composite is a tight fit in the inner sleeve 223 and locates around and provides a bearing for a hinge pin 226 for example of stainless steel, which extends through a cast in situ bronze liner 233 in an outer wall 234 of the vane 235 and through another cast in situ bronze liner 233 in an end wall 240 of the rear pontoon 212. The hinge pin 226 has a shoulder 241 which bears against the end wall 240 and has a central slot 242 in which a tongue 243 from a metal clamp plate 244 locates, the clamp plate 244 being secured to the end wall 240 by screws (not shown) which locate in conventional cast in situ threaded sockets (not shown). A resiliently flexible journal bearing mounting 221 is provided at the locations 216 in an identical manner to that described in relation to location 215 except that the shoulder 241 of the respective hinge pin 226 bears against an outer wall 234 of the adjacent vane 235 and is secured thereto by screws (not shown).

In order to resist lateral thrust forces, a thrust bearing 237 is provided at each end location 215. The thrust bearing 237 is constituted by a metal (e.g. bronze or stainless steel) annular disc 251 cast in situ in a circular groove 250 in the end wall 240 and having a bronze thrust bearing washer 252 secured to it by screws (not shown), the thrust washer 252 bearing on its other side against a metal annular disc 255 cast in situ in the outer wall 234 of the adjacent vane 235.

Figure 15A:
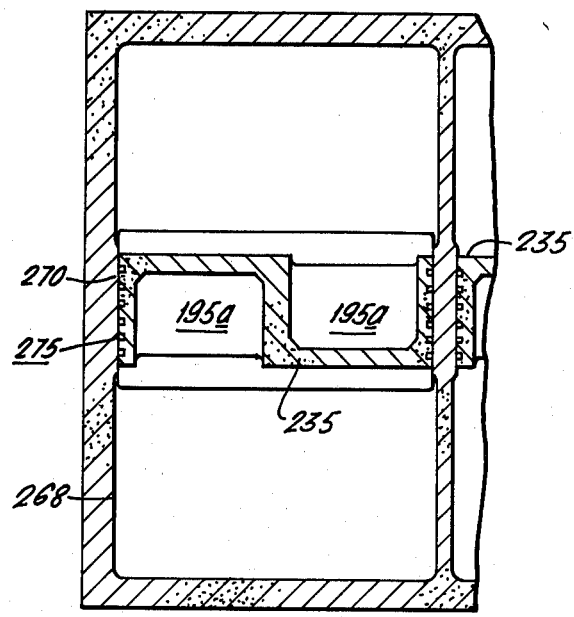
FIG. 15a shows a fragmentary sectional representation on the line XVa—XVa of FIG. 15.

Referring now to FIG. 14 and FIG. 15, each vane 235 extends into a pump chamber 267 defined by a pump body 268 of sectoral shape in the leading pontoon 210a (or 210b). Each pump chamber 267 has a central portion 270 which is a close fit against the adjacent end of the vane 235 during a pivotal angle of the vane 235 of about 40° which is the expected extent of the relative motion likely to occur in most seas between the leading pontoons 210a and 210b and the rear pontoon 212 except in storm conditions. That part of the pump body 268 outside the central portion 270 is relieved to increase the clearance between the pump body 268 and the vane 235 so as to reduce the drag exerted by any marine growth on movement of the vane 235 in the infrequently swept portion of the pump body 268 outside the central portion 270. Several longitudinal grooves 271 are provided at the end of the vane 235 to create turbulence which seals the narrow gap between the pump body 268 and the vane 235 at the central portion 270. As shown in FIG. 15a to which reference is made, the central portion 270 extends along the sides of the pump body 268, and grooves 275 in the outer walls 234 of the vanes 235 extend from and perform the same function as the grooves 271 in providing a seal between the pump body 268 and the vane 235.

Referring again to FIGS. 14 and 15, the vane 235 has a bearing portion 266 with a central portion 272 against which a metal (e.g. bronze) angle member 273 is a close fit, the angle member 273 having longitudinal grooves 274 to create turbulence and effect a seal in the same manner as the grooves 271 and 275 in the vane 235. The angle member 273 is secured to the pump body 268 by bolts (not shown) which locate in a cast in situ metal (e.g. bronze) mounting plate 269, an arrangement which eases assembly and enables the angle member 273 to be replaced when worn or damaged. The bearing portion 266 extends for an included angle of 40°, and beyond this angle the bearing portion 266 is relieved to provide clearance and reduce the effect of any marine growth on the movement of the vane 235. In a similar manner to that described in relation to FIGS. 6 to 10, each channel 195a leads to an inner chamber 279 of a respective rectifying chamber 236 having non-return valves 281 for flow of liquid from an inlet 280, and non-return valves 282 for the flow of liquid from the inner chamber 279 to a discharge chamber 284 from which liquid is discharged to a respective manifold 247 of increasing cross-section. Each manifold 247 discharges through a connecting duct 290 to a "Straflo" straight flow turbine 253 arranged to drive a generator 259 and from which liquid is finally exhausted through an outlet duct 290. The connecting duct 290 also provides an inlet for an open top reservoir 248 which performs the same function as the reservoir 248 of FIG. 8.

The Cockerell Raft of FIGS. 11 to 15 operates in a similar manner to the Cockerell Rafts of FIGS. 1 to 8, relative motion between the leading pontoons 210a and 210b and the rear pontoon 212 causing the vanes 235 to pivot in the pump chambers 267 so that liquid (e.g. seawater) is displaced in the pump chambers 267 and discharged through the inner chambers 279 to the respective discharge chambers 284 and into the respective manifold 247 where the liquid is fed through the connecting duct 290 to the turbine 253 and exhausts through the outlet duct 254.

One of the advantages of using a plurality of hinge bearings is that it reduces the load on individual hinge bearings, and the use of resiliently flexible mountings for the hinge bearings compensates for any slight misalignment of the hinge bearings.

It will be understood that the invention may be incorporated in alternative devices for extracting energy from waves, and may be fabricated from suitable alternative materials to those described in relation to the devices of FIGS. 1 to 15.

As an alternative to withdrawing liquid in which the device is arranged to float and displacing this liquid through a turbine, a closed cycle may be used so that the liquid discharged from the turbine is arranged to be recycled through the vane pump.

It will be appreciated that the invention may be used to energise some other means of performing useful work from wave power, such as a hydraulic motor.

We claim:

1. A device for extracting energy from waves on a liquid, comprising two members hingedly connected one to another so as to allow angular relative motion between the members in response to waves, at least one of the members being of buoyant construction, and pump means between said hingedly connected members for displacing fluid in response to said relative motion, wherein the improvement comprises, said pump means comprising a vane pump having a pump chamber defined by one end of one of the hingedly connected members, and a vane defined by the adjacent end of the other hingedly connected member and extending therefrom into said pump chamber so as to be displaced angularly in said pump chamber by said relative motion, thereby to displace said fluid.

2. A device as claimed in claim 1, including pivot means about which the vane is arranged to turn about an axis substantially co-axial with that of the hinged connection of the two members.

3. A device as claimed in claim 1 or claim 2, further comprising an open channel along the vane, port means at the channel, and a duct in the vane connected to the port means for the flow of the liquid into and out of the pump chamber through the duct means and the port means.

4. A device as claimed in claim 1, wherein the hinged connection of the two members comprises a plurality of hinge bearings, and resiliently flexible means comprising elastomeric material supporting each hinge bearing.

5. A device as claimed in claim 1, wherein several said members are hingedly connected in parallel relationship to a common said member, at least one said vane pump being between each said parallel member and the said common member.

6. A device as claimed in claim 1, and comprising a plurality of said members hingedly connected together in series relationship, each adjacent pair of the members having at least one said vane pump therebetween.

7. A device as claimed in claim 1, wherein a plurality of said vane pumps in parallel relationship are between the hingedly connected members.

8. A device as claimed in claim 7 including a reservoir on the rear pontoon for receiving the liquid displaced by the vane pumps, a turbine means disposed below the reservoir, and duct means connecting the reservoir to the turbine means, the reservoir having an overflow arranged to limit the pressure head of the liquid on the turbine means.

9. A device as claimed in claim 8, including manifold means connecting the vane pumps to the reservoir.

10. A device for extracting energy from sea waves and comprising,
  (a) two leading pontoons aligned in parallel relationship;
  (b) a rear pontoon;
  (c) hinge means connecting the two leading pontoons in parallel relationship to the rear pontoon, the hinge means comprising, a plurality of hinge bearings, and a resilient mounting for each hinge bearing and comprising elastomeric material of annular form about said each hinge bearing;
  (d) each leading pontoon defining a respective chamber adjacent to the rear pontoon, the chamber being of sectoral cross-section and defined from an axis co-axial with the axis of the hinge bearings;
  (e) two vanes extending from the rear pontoon one into each chamber, each vane having a portion thereof of cylindrical form co-axial with the hinge bearing axis and being of hollow form so as to define an even plurality of channels therethrough;
  (f) sealing means secured to each leading pontoon adjacent to and about the cylindrical portions of the vanes;
  (g) an inlet duct means for seawater in the rear pontoon adjacent to each vane and downwardly extending therefrom and connected at one end to alternate channels in the vanes;
  (h) non-return valve means in the inlet duct means;
  (i) ports connecting the channels in an alternate manner to opposite sides of the vanes, so that adjacent channels have ports into opposite sides of the respective chamber;
  (j) discharge ducts connected to the other alternate channels of each vane;
  (k) non-return valve means in the discharge ducts to permit the flow of the seawater from the channels through the discharge ducts;
  (l) a manifold for each vane and connected to the discharge ducts of said each vane;
  (m) a reservoir having an open top and extending above the manifolds and to which the manifolds are connected;
  (n) a turbine disposed below the reservoir;
  (p) a duct connecting the reservoir at the bottom thereof to the turbine, and
  (r) an electric generator drivable connected to the turbine.

11. A device as claimed in claim 10, wherein the leading pontoons at that end thereof remote from the hinge means are each shaped to define a declivitous surface from said end.

* * * * *